United States Patent

Minamide

(10) Patent No.: US 8,390,682 B2
(45) Date of Patent: Mar. 5, 2013

(54) MICROSCOPE SYSTEM AND ITS CONTROL METHOD

(75) Inventor: Takeshi Minamide, Tokyo (JP)

(73) Assignee: Olympus Corporation, Tokyo (JP)

( * ) Notice: Subject to any disclaimer, the term of this patent is extended or adjusted under 35 U.S.C. 154(b) by 676 days.

(21) Appl. No.: 12/686,536

(22) Filed: Jan. 13, 2010

(65) Prior Publication Data

US 2010/0188498 A1    Jul. 29, 2010

(30) Foreign Application Priority Data

Jan. 23, 2009   (JP) .................................. 2009-013533

(51) Int. Cl.
*G02B 21/36* (2006.01)

(52) U.S. Cl. ............ 348/80; 348/79; 396/432; 359/368; 250/201.3

(58) Field of Classification Search ........................ None
See application file for complete search history.

(56) References Cited

U.S. PATENT DOCUMENTS

| 6,091,911 A * | 7/2000 | Sakano et al. ............... 396/432 |
| 7,180,689 B2 | 2/2007 | Shinada |
| 2005/0088731 A1 | 4/2005 | Shinada |

FOREIGN PATENT DOCUMENTS

| JP | 2000-047116 | 2/2000 |
| JP | 2005-128429 | 5/2005 |

* cited by examiner

*Primary Examiner* — Christopher S Kelley
*Assistant Examiner* — Mohammed Jebari
(74) *Attorney, Agent, or Firm* — Scully Scott Murphy & Presser, PC

(57) ABSTRACT

A microscope system includes a light amount ratio changing unit for changing a ratio of the amount of light directed to a first optical path for directing an optical image of the sample to an eyepiece lens and a second optical path for directing an optical image of the sample to an image capturing unit, an image capturing controlling unit for controlling an exposure time of the image capturing unit, and a controlling unit for obtaining a first exposure time from the image capturing controlling unit, for calculating a second exposure time on the basis of the first exposure time and a second ratio of the amount of light, and for controlling the image capturing controlling unit to set the second exposure time as the exposure time if the light amount ratio changing unit changes to the second ratio of the amount of light.

4 Claims, 7 Drawing Sheets

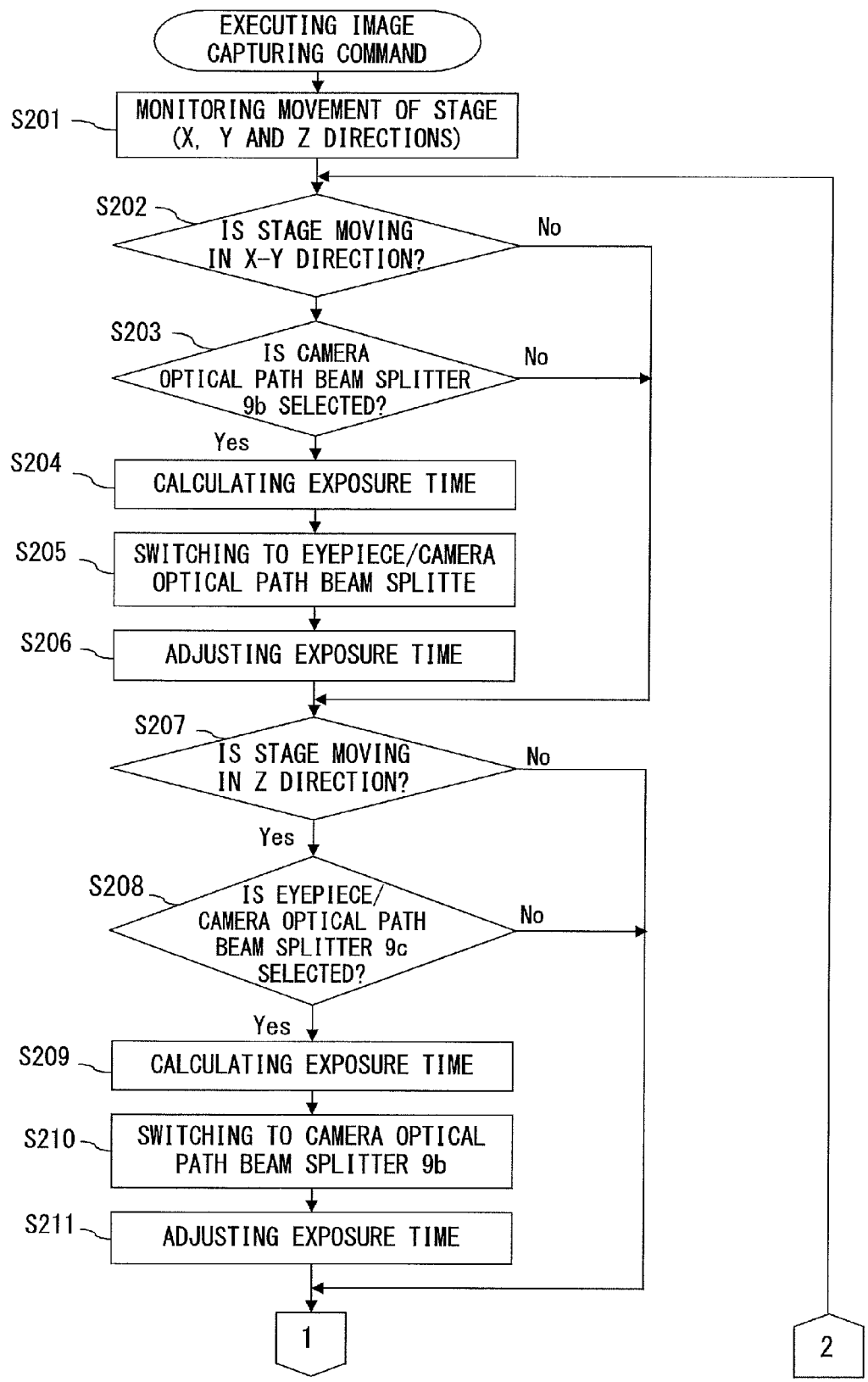
F I G. 6 A

MICROSCOPE SYSTEM AND ITS CONTROL METHOD

CROSS REFERENCE TO RELATED APPLICATION

This application is based on and claims the benefit of priority from prior Japanese Patent Application No. 2009-013533 filed in Japan on Jan. 23, 2009, the entire contents of which are incorporated by this reference.

BACKGROUND OF THE INVENTION

1. Field of the Invention

The present invention relates to a microscope image shooting system using a microscope digital camera that shoots a sample image of a microscope.

2. Description of the Related Art

With the popularization of high-performance digital cameras, microscope images have been being shot by connecting a digital camera to a microscope. A microscope used for such a microscope observation includes an optical path for directing a sample image to an eyepiece lens, and an optical path for directing the sample image to a digital camera. By switching between these optical paths, the sample image can be directed to the eyepiece lens or the digital camera, or the sample image can be simultaneously directed to both of the optical paths by dividing the amount of light.

If the sample image is simultaneously directed to both of the optical paths by dividing the amount of light, the amount of light can be set, for example, in three ways: (1) at a ratio of 100%:0% (the eyepiece lens side:the camera side), (2) at a ratio of 50%:50% (the eyepiece lens side:the camera side), and (3) at a ratio of 0%:100% (the eyepiece lens side:the camera side). If the amount of light is split between both the eyepiece lens side and the camera side as in (2), a ratio of the amount of light split can be changed. The sample image directed to the eyepiece lens can be observed by looking through the eyepiece lens.

In the meantime, the sample image directed to the digital camera is image-processed by the digital camera, so that digital image data is generated. The generated digital image data of the sample image can be displayed on a monitor. Accordingly, an observer can observe the sample image displayed on the monitor. Moreover, a sample image directed to the digital camera is continuously image-processed, and its digital image data is displayed on the monitor, whereby the observer can observe the sample image in real time (hereinafter referred to as a live image display).

Accordingly, the observer can select from among observing using the eyepiece lens, observing using the live image display of the digital camera, and using both manners of observing. Therefore, the observer can search for a point to be observed while viewing a sample image displayed as a live image, and can observe the image with the eyepiece lens.

Additionally, if a microscope image is obtained by shooting a sample image, the observer can shoot a sharp microscope image by switching to the optical path for directing the total amount of light of the sample image to the digital camera. In this case, the amount of light directed to the digital camera is changed by optical path switching. Recent digital cameras have been enabled to detect the amount of light directed thereto, and to adjust an exposure time thereof. As a result, it is possible to shoot an image with a constant level of brightness even with a different amount of light.

However, a predetermined length of time is needed until the digital camera is adjusted to an optimum exposure time. Therefore, it is impossible to shoot an image immediately after optical path switching. Moreover, if the optical path for directing a sample image to both the eyepiece lens and the digital camera is set, light incident from the outside of the microscope is directed from the eyepiece lens, the light invades into the optical path on the side of the digital camera, and external light is sometimes shot. Therefore, if an observer forgets to perform optical path switching and shoots an image with the setting of the optical path for directing a sample image to both the eyepiece lens and the digital camera unchanged, it is possible that light other than the sample image will be shot. Accordingly, the observer needs to appropriately perform optical path switching.

In the meantime, the following methods related to optical path switching at the time of a microscope observation are known. Japanese Laid-open Patent Publication No. 2005-128429 discloses a microscope system that includes a small optical path switching unit and electrically switches an optical path. Japanese Laid-open Patent Publication No. 2000-47116 discloses a technique for adjusting the amount of illumination light of a microscope at the time optical path switching is performed and for obtaining an optimum amount of light irrespective of an optical path.

SUMMARY OF THE INVENTION

A microscope system for observing a sample placed on a stage includes: an eyepiece lens for observing the sample with the naked eye; an image capturing unit for capturing an image of the sample; a light amount ratio changing unit for changing a ratio of the amount of light directed to a first optical path for directing an optical image of the sample to the eyepiece lens, and a second optical path for directing the optical image of the sample to the image capturing unit; an image capturing controlling unit for controlling an exposure time of the image capturing unit; and a controlling unit for obtaining a first exposure time from the image capturing controlling unit if the light amount ratio changing unit sets the ratio of the amount of light to a first ratio of the amount of light, for calculating a second exposure time on the basis of the first exposure time and a second ratio of the amount of light changed by the light amount ratio changing unit, and for controlling the image capturing controlling unit to set the second exposure time as the exposure time of the image capturing unit if the light amount ratio changing unit changes to the second ratio of the amount of light.

A method for controlling a microscope system includes: obtaining a first exposure time set in an image capturing device if a first beam splitter which is set to a first ratio of the amount of light is selected by a beam splitter unit for switching from among a plurality of beam splitters each having a different ratio of the amount of light directed to a first optical path for directing an optical image of a sample to an eyepiece lens and a second optical path for directing the optical image of the sample to the image capturing device; calculating a second exposure time on the basis of the first exposure time and a second ratio of the amount of light corresponding to a second beam splitter that can be switched by the beam splitter unit; switching to the second beam splitter by the beam splitter unit; and capturing a microscope image by setting the calculated second exposure time in the image capturing device.

BRIEF DESCRIPTION OF THE DRAWINGS

FIG. 6A illustrates a flow (No. 1) of optical path switching which occurs with an operation of a stage in the second embodiment.

DESCRIPTION OF THE PREFERRED EMBODIMENTS

Figure 1:
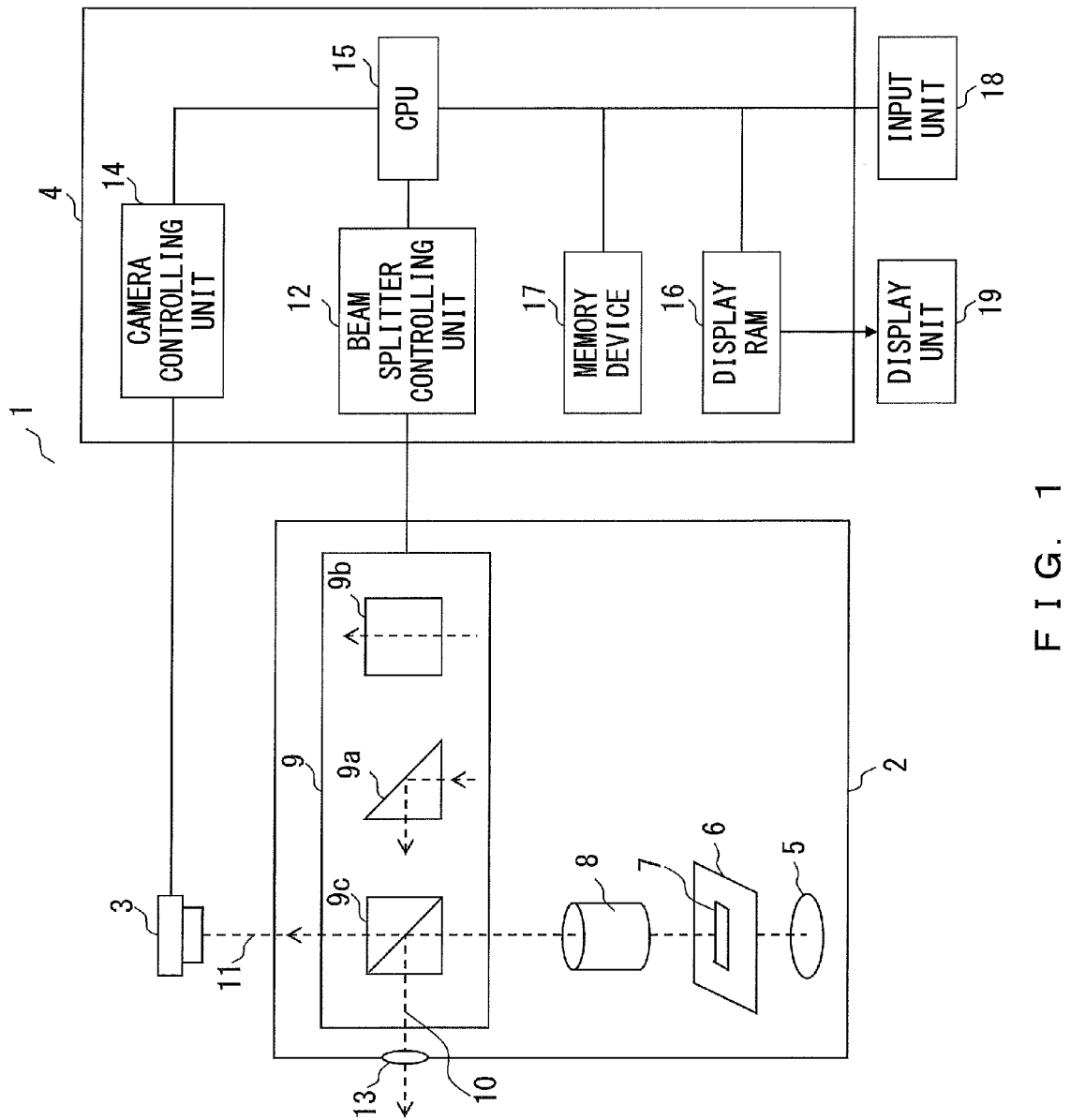
FIG. 1 illustrates an outline of a configuration of a microscope system according to the first embodiment.

According to Japanese Laid-open Patent Publication No. 2005-128429, it is possible to easily switch an optical path in accordance with an electric control. However, an observer has to instruct that switching be performed depending on an observation method, and a shooting mistake is sometimes caused by an observer forgetting optical path switching. Moreover, a change in the amount of light at the time of optical path switching is not considered. Accordingly, an exposure time of a camera needs to be adjusted each time an optical path is switched, leading to inconvenience in a microscope observation.

Additionally, recent digital cameras have been provided with an auto-exposure control function. Therefore, they are automatically adjusted to an optimum exposure time. However, with a technique disclosed by Japanese Laid-open Patent Publication No. 2005-128429, several seconds are needed until the exposure time is adjusted by the automatic exposure control function. Accordingly, an observer has to wait until the exposure time is stabilized each time the amount of light is changed by optical path switching.

According to Japanese Laid-open Patent Publication No. 2000-47116, it is possible to adjust the amount of illumination light of a microscope simultaneously with optical path switching. As a result, it becomes possible to make the amount of light directed to a digital camera constant despite the optical path switching.

However, with the technique disclosed by Japanese Laid-open Patent Publication No. 2000-47116, an observer has to respectively operate the digital camera and a microscope. For example, if the observer shoots an image by using an optical path for directing a sample image to both an eyepiece lens and the digital camera without switching an optical path, it is possible that light from the eyepiece lens will be shot along with it. As described above, suitable shooting becomes impossible due to operation mistakes being made in some cases.

Therefore, the present invention provides a microscope system that is capable of changing a ratio of the amount of light split between optical paths in accordance with a shooting condition or a microscope operation, and that enables a sharp microscope image to be shot quickly and easily.

A microscope system for observing a sample placed on a stage according to an embodiment of the present invention includes an eyepiece lens, an image capturing unit, a light amount ratio changing unit, an image capturing controlling unit, and a controlling unit.

The eyepiece lens is intended to allow observation of the sample with the naked eye. The eyepiece lens corresponds to, for example, an eyepiece lens 13 in this embodiment.

The image capturing unit captures an image of the sample. The image capturing unit corresponds to, for example, a digital camera 3 in this embodiment.

The light amount ratio changing unit changes a ratio of the amount of light directed to the first optical path (eyepiece optical path 10) for directing an optical image of the sample to the eyepiece lens, and the second optical path (camera optical path 11) for directing the optical image of the sample to the image capturing unit. The light amount ratio changing unit can switch between the first beam splitter for making an observation light incident to the first and the second optical paths at a ratio of $A_1$ to $B_1$, and the second beam splitter for making the observation light incident to the first and the second optical paths at a ratio of $A_2$ to $B_2$. The light amount ratio changing unit corresponds to, for example, a beam splitter unit 9 in this embodiment.

The image capturing controlling unit controls an exposure time of the image capturing unit. The image capturing controlling unit corresponds to, for example, a camera controlling unit 14 in this embodiment.

If the light amount ratio changing unit sets the ratio of the amount of light to the first ratio of the amount of light, the controlling unit obtains the first exposure time from the image capturing controlling unit. Then, the controlling unit calculates the second exposure time on the basis of the first exposure time and the second ratio of the amount of light changed by the light amount ratio changing unit. If the light amount ratio changing unit changes to the second ratio of the amount of light, then the controlling unit controls the image capturing controlling unit to set the second exposure time as the exposure time of the image capturing unit. Specifically, if the light amount ratio changing unit selects the first beam splitter, the controlling unit obtains the first exposure time from the image capturing controlling unit. Then, the controlling unit calculates the second exposure time by multiplying the first exposure time by $\{B_1/(A_1+B_1)\}/\{B_2/(A_2+B_2)\}$. Then, if the light amount ratio changing unit switches from the first beam splitter to the second beam splitter, the controlling unit controls the image capturing controlling unit to set the second exposure time as the exposure time of the image capturing unit. The controlling unit corresponds to, for example, a CPU 15 in this embodiment.

With such a configuration, a sharp microscope image can be quickly and easily shot by the microscope system capable of changing the ratio of the amount of light split between the optical paths in accordance with a shooting condition or a microscope operation.

The microscope system further includes a vibration detecting unit. The vibration detecting unit detects vibrations that occur with a beam splitter change performed by the light amount ratio changing unit. The vibration detecting unit corresponds to, for example, a vibration sensor 20 in this embodiment. In this case, the controlling unit controls the image capturing controlling unit to drive the image capturing unit so as to capture an image by using the set second exposure time after the vibration detecting unit detects no more vibrations.

Such a configuration enables an image to be shot after beam splitter switching is securely performed.

Additionally, the stage is an electrically operated stage that is movable in three spatial dimensions. The stage corresponds to, for example, a stage 6 in this embodiment.

At this time, the microscope system further includes a stage movement detecting unit for detecting a movement of the stage. In this case, the controlling unit performs the above described controls on the basis of a result of detection performed by the stage movement detecting unit, and causes the image capturing controlling unit to set the exposure time of the image capturing unit to the second exposure time. The stage movement detecting unit corresponds to, for example, an encoder 22 in this embodiment.

Such a configuration enables an observation using the eyepiece/camera optical path beam splitter at the time of framing, and also enables an observation using the camera optical path beam splitter at the time of a focus adjustment and shooting. At the same time, an exposure time calculated in advance is set simultaneously with optical path switching, thereby enabling an observation to be immediately continued without waiting for the completion of adjusting an exposure time.

<First Embodiment>

This embodiment refers to a microscope system that is capable of changing a ratio of the amount of light split between the optical paths (capable of switching among the beam splitters), that calculates, before the ratio of the amount of light is changed, an exposure time of the digital camera which is used after the ratio of the amount of light is changed, and that sets the calculated exposure time in the digital camera simultaneously with a change in the ratio of the amount of light.

FIG. 1 illustrates an outline of a configuration of the microscope system according to this embodiment. The microscope system 1 includes a microscope 2, a digital camera 3, and a controlling device 4. The microscope 2 includes a light source 5, a stage 6, an objective lens 8, a beam splitter unit 9, an eyepiece lens 13, and the like.

The light source 5 of epi-illumination 5 is a light source such as a mercury lamp or the like for radiating illumination light. The stage 6 is electrically movable in a horizontal direction and a direction of an observation optical path. A sample 7 is placed on the stage 6.

The objective lens 8 enlarges, at a desired magnification, an optical image of the sample 7 on which the illumination light from the light source 5 is radiated. Light that has passed through the objective lens 8 (referred to as an observation light hereinafter) is incident to the beam splitter unit 9.

The beam splitter unit 9 includes beam splitters each splitting the observation light from the objective lens 8 into two beams. Namely, the observation light from the objective lens 8 is split to either or both of the eyepiece optical path 10 leading to the eyepiece lens 13 and the camera optical path 11 leading to the digital camera 3, and the beams are respectively directed to the optical paths via the beam splitter unit 9.

Here, the beam splitter unit 9 includes an eyepiece optical path beam splitter 9a, a camera optical path beam splitter 9b, and an eyepiece/camera optical path beam splitter 9c. The eyepiece optical path beam splitter 9a makes the total amount of the observation light incident to the eyepiece optical path 10. The camera optical path beam splitter 9b makes the total amount of the observation light incident to the camera optical path 11. The eyepiece/camera optical path beam splitter 9c splits the observation light and makes it incident to both the eyepiece optical path 10 and the camera optical path 11.

The beam splitter unit 9 is connected to a beam splitter controlling unit 12. The beam splitter controlling unit 12 controls operations of the beam splitter unit 9. The beam splitter unit 9 can switch among the beam splitters in accordance with a control signal communicated from the beam splitter controlling unit 12. As a result, the beam splitter unit 9 can arbitrarily switch between the optical paths of the observation light, namely, the beam splitter unit 9 can change the ratio of the amount of light split between the optical paths.

The observation light directed to the eyepiece optical path 10 is directed to the eyepiece lens 13. The observation light directed to the camera optical path 11 is directed to the digital camera 3.

The digital camera 3 is attached to the microscope 2 and is capable of shooting a sample image. Moreover, the digital camera 3 is connected to a camera controlling unit 14. The camera controlling unit 14 controls the digital camera 3. The digital camera 3 operates in accordance with a control signal communicated from the camera controlling unit 14.

The controlling device 4 is a computer such as a personal computer (hereinafter referred to as a PC) or the like. The controlling device 4 includes a CPU 15, the camera controlling unit 14, the beam splitter controlling unit 12, a memory device 17, a display RAM 16, a ROM (not illustrated) for storing a CPU program, and other components. The ROM for storing a CPU program stores a program for issuing instructions to the controlling units. The CPU 15 is a central processing unit as a controlling unit including a RAM.

A display unit 19 such as a monitor or the like is connected to the display RAM 16. Data written to the display RAM 16 is displayed on the display unit 19 in accordance with an instruction issued from the CPU 15.

The memory device 17 is a storage device such as a hard disk drive (HDD) or the like. The CPU 15 records an image to the memory device 17, or reads the image from the memory device 17.

The controlling unit 4 is connected to an input device 18. The input device 18 is an input device such as a keyboard, a mouse, a touch panel device, a tablet, or the like. An observer can control the operations of the microscope 2 via the controlling unit 4 by operating the input device 18.

Various types of operational instructions input by an observer with the input device 18 are analyzed and processed by the CPU 15. The CPU 15 transfers a control signal based on an operational instruction to the corresponding controlling unit (12, 14 or the like) on the basis of an analysis result. The controlling unit (12, 14 or the like) detects an operation of each corresponding unit or information from each corresponding unit on the basis of the control signal transferred from the CPU 15.

A sample image made incident to the digital camera 3 is converted into a digital signal via a photoelectric conversion element and an A/D converter, which are included in the digital camera 3 and not illustrated. The converted digital signal is image-processed by an image processing unit (not illustrated) included in the digital camera 3. As a result, digital image data is generated. The generated digital image data is transmitted to the CPU 15 via the camera controlling unit 14. The CPU 15 writes the digital image data to the display RAM 16 as display data, so that the digital image data can be displayed on the display unit 19. A microscope image can be displayed on the display unit 19 in real time (i.e., the microscope image can be displayed as a live image) by continuously performing the operations from the generation of digital image data to the displaying of the display on the display unit 19 in the digital camera 3.

Additionally, the CPU 15 can record the microscope image by writing the digital image data transferred from the digital camera 3 to the memory device 17.

Furthermore, as for the control related to shooting, the CPU 15 outputs a control signal such as an exposure time or the like to the digital camera 3 via the camera controlling unit 14.

In the meantime, application software for the digital camera 3 and the beam splitter unit 9 is installed in the memory device 17. The CPU 15 activates the software by reading and executing the installed software. If an observer operates the application software by using the input device 18, an instruction is transmitted to the corresponding controlling unit (12, 14 or the like) in accordance with an input operation. As a result, the observer can perform a camera operation such as a live image display, shooting, or the like, or can switch among the beam splitters. Moreover, the application software communicates with the camera controlling unit 14 and the beam splitter controlling unit 12, obtains state information of the digital camera 3 or the beam splitter unit 9 (such as an exposure time of the digital camera 3 or the like), and causes the display unit 19 to display the obtained state information.

Figure 2:
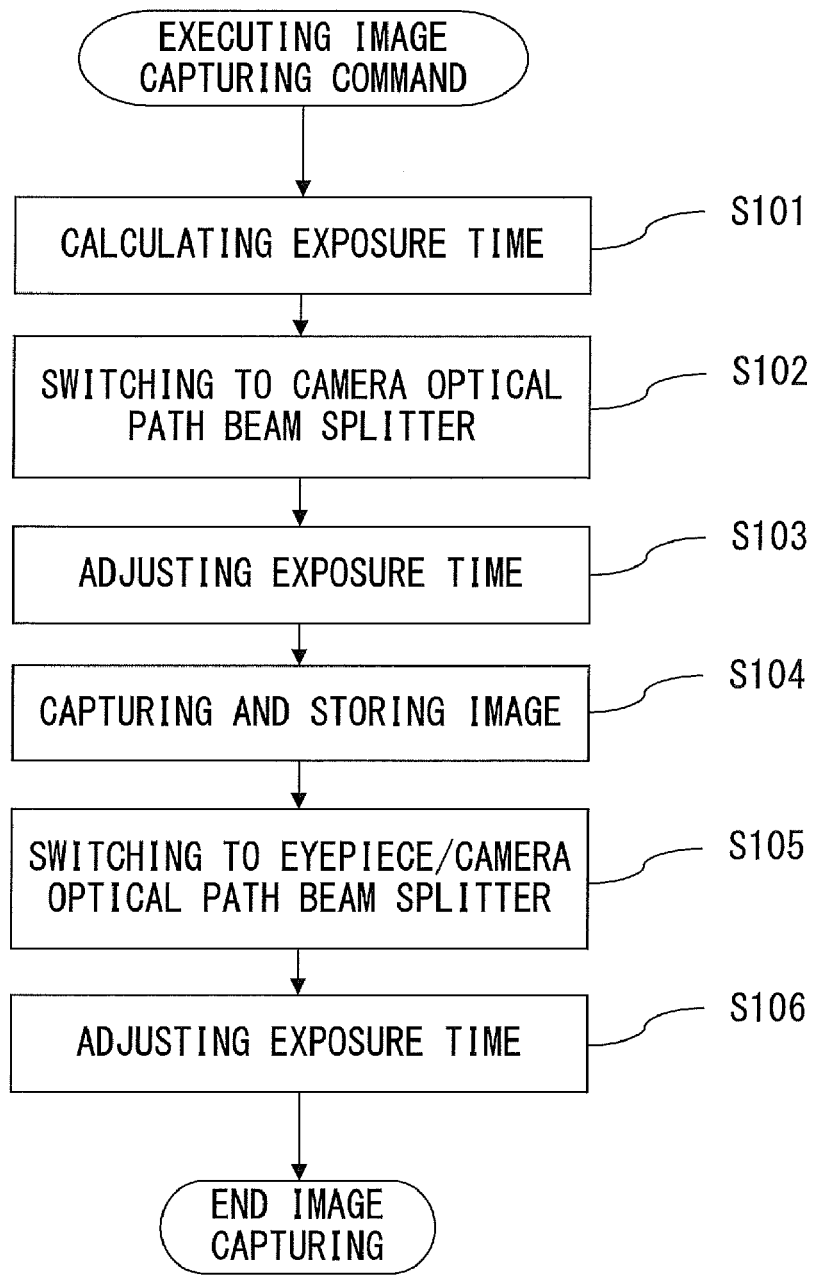
FIG. 2 illustrates a flow executed at the time of shooting of the microscope system according to the first embodiment.

FIG. 2 illustrates a flow executed at the time of shooting of the microscope system according to this embodiment. In this flow, it is assumed that a microscope image is displayed as a live image, and the eyepiece/camera optical path beam splitter 9c is selected at the start of the flow. If a live image is not displayed or if the camera optical path beam splitter 9b is selected, this flow is not applied.

If an observer instructs that shooting be performed via the input device 18, the CPU 15 generates a shooting command and inputs the generated command to the camera controlling unit 14. The CPU 15 calculates an exposure time set after optical path switching on the basis of the exposure time of the digital camera 3, which is set when the shooting command is input (S101). Specifically, the camera controlling unit 14 communicates with the digital camera 3, obtains an exposure time set when the shooting command is input, namely, the exposure time set when the eyepiece/camera optical path beam splitter 9c is selected, and transmits the obtained exposure time to the CPU 15.

The CPU 15 calculates an exposure time set when switching to the camera optical path beam splitter 9b is performed on the basis of the exposure time that is transmitted from the digital camera 3 and set when the eyepiece/camera optical path beam splitter 9c is selected.

The exposure time is calculated on the basis of the ratio of the amount of light made incident to the camera optical path 11 when a corresponding beam splitter is selected. Here, assume that the eyepiece/camera optical path beam splitter 9c splits the optical path at a ratio of the amount of light of A:B (the eye eyepiece optical path:the camera optical path). In this case, the amount of light made incident to the digital camera 3 when switching to the camera optical path beam splitter 9b is performed results in a multiple of (A+B)/B in comparison with the amount of light set when the eyepiece/camera optical path beam splitter 9c is selected. Accordingly, the exposure time set when the camera optical path beam splitter 9b is selected results in a multiple of B/(A+B) in comparison with the amount of light set when the eyepiece/camera optical path beam splitter 9c is selected.

Assume that the amount of light made incident to the digital camera 3 when the camera optical path beam splitter 9b is used is 100%. Also assume that the eyepiece/camera optical path beam splitter 9c splits the amount of light at a ratio of 50%:50% (the eyepiece optical path:the camera optical path). In this case, the amount of light made incident to the digital camera 3 changes from 50% to 100%, which is double, when switching from the eyepiece/camera optical path beam splitter 9c to the camera optical path beam splitter 9b is performed. Accordingly, the exposure time set when the camera optical path beam splitter 9b is selected results in one half of the amount of light set when the eyepiece/camera optical path beam splitter 9c is selected.

Thereafter, optical path switching is performed in accordance with the generated shooting command (S102). Namely, the CPU 15 communicates with the beam splitter controlling unit 12, and transmits an optical path switching instruction to the beam splitter unit 9. Then, the beam splitter unit 9 switches to the camera optical path beam splitter 9b.

Then, the exposure time calculated in S101 is input from the CPU 15 to the digital camera 3 via the camera controlling unit 14. Namely, the camera controlling unit 14 adjusts the exposure time of the digital camera 3 to the exposure time calculated in advance in S101 (S103). As a result, shooting can be immediately performed without waiting for the adjustment of the exposure time, which is performed with a change in the amount of light after optical path switching.

The shooting instruction is transmitted from the CPU 15 to the digital camera 3 via the camera controlling unit 14. In accordance with this instruction, the digital camera 3 shoots an image. Here, the image may be shot as a still image or a moving image. Digital image data of the microscope image obtained by the digital camera 3 is transmitted to the memory device 17 via the camera controlling unit 14 and the CPU 15, and is stored in the memory device 17 (S104).

Then, a signal that indicates completion of shooting is communicated from the CPU 15 to the beam splitter controlling unit 12. Then, the beam splitter controlling unit 12 controls the beam splitter unit 9 to again switch to the eyepiece/camera optical path beam splitter 9c (S105).

Thereafter, the CPU 15 transmits, to the digital camera 3, the exposure time that is set when the eyepiece/camera optical path beam splitter 9c is used and is obtained in S101, and adjusts the exposure time (S106). As a result, the states of the microscope and the digital camera are restored to the same states as those when the shooting command is executed, and the shooting is completed.

As described above, if an observer instructs that shooting be performed, the ratio of the amount of light split between the optical paths is changed in this embodiment. At this time, the exposure time of the digital camera 3 is adjusted to an optimum exposure time immediately after optical path switching by calculating, in advance, the exposure time set after optical path switching. Then, shooting is performed, and the states of the microscope and the camera are restored to the same states as those when the shooting command is executed. As a result, an observer can quickly shoot a microscope image with an optimum optical path only by instructing that shooting be performed. Moreover, a loss in the length of time needed for optical path switching or a mistake in optical path switching when a microscope image is shot can be eliminated.

MODIFICATION EXAMPLE 1

If the ratio of the amount of light split between the optical paths is electrically changed, the beam splitter unit 9 vibrates in some cases. If the beam splitter unit 9 vibrates when an image is shot after optical path switching, it is possible that the shot image will be disturbed. Therefore, the image may be shot after it has been detected that the beam splitter unit 9 is no longer vibrating after optical path switching.

Figure 3:
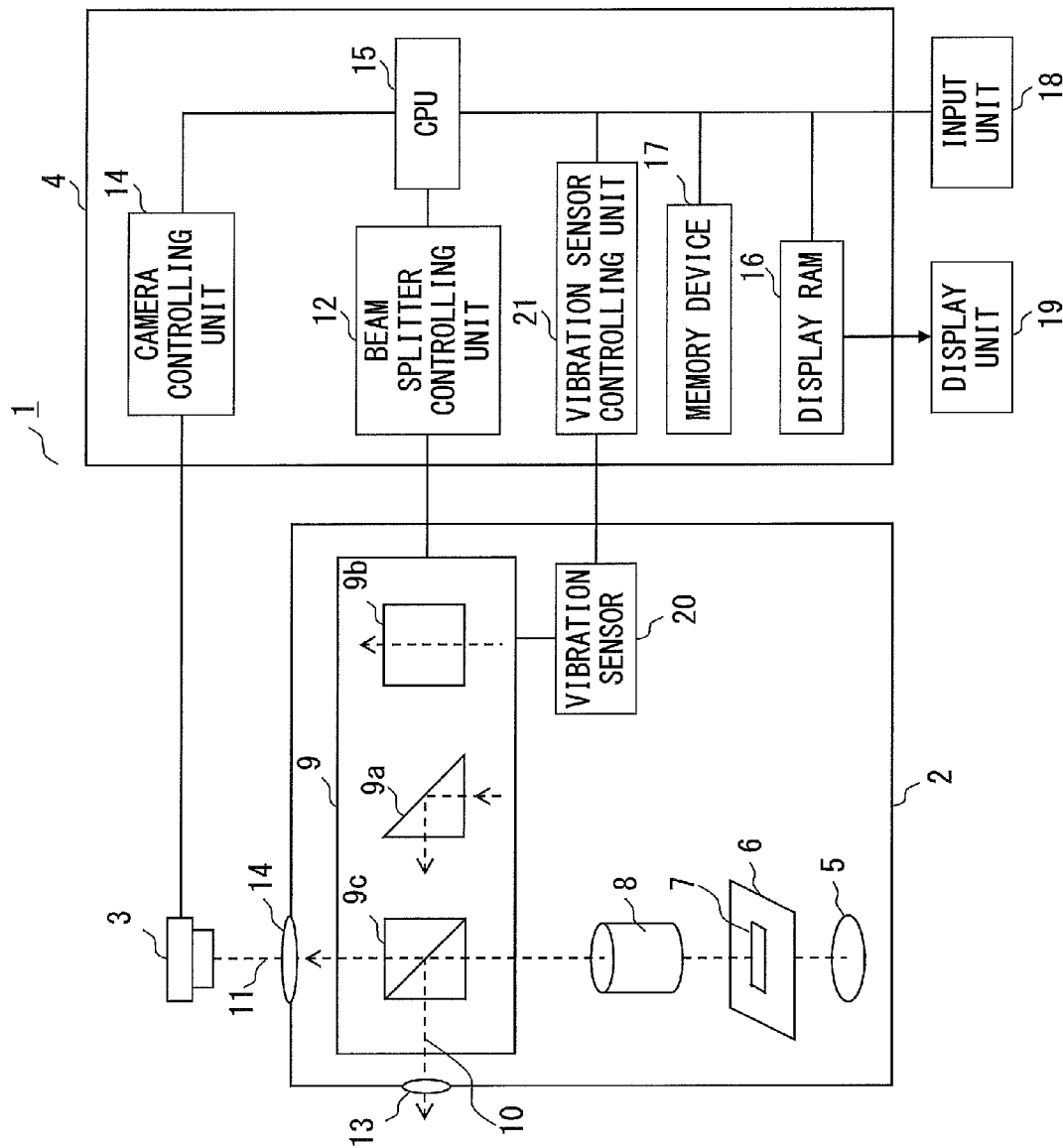
FIG. 3 illustrates an outline of a configuration of a microscope system in a modification example 1 of the first embodiment.

FIG. 3 illustrates an outline of a configuration of a microscope system according to a modification example 1 of the first embodiment. The configuration illustrated in FIG. 3 is implemented by providing in the beam splitter unit 9 a vibration sensor 20 which can detect vibrations and by providing a vibration sensor controlling unit 21 in the controlling device 4 in the microscope system illustrated in FIG. 1.

Figure 4:
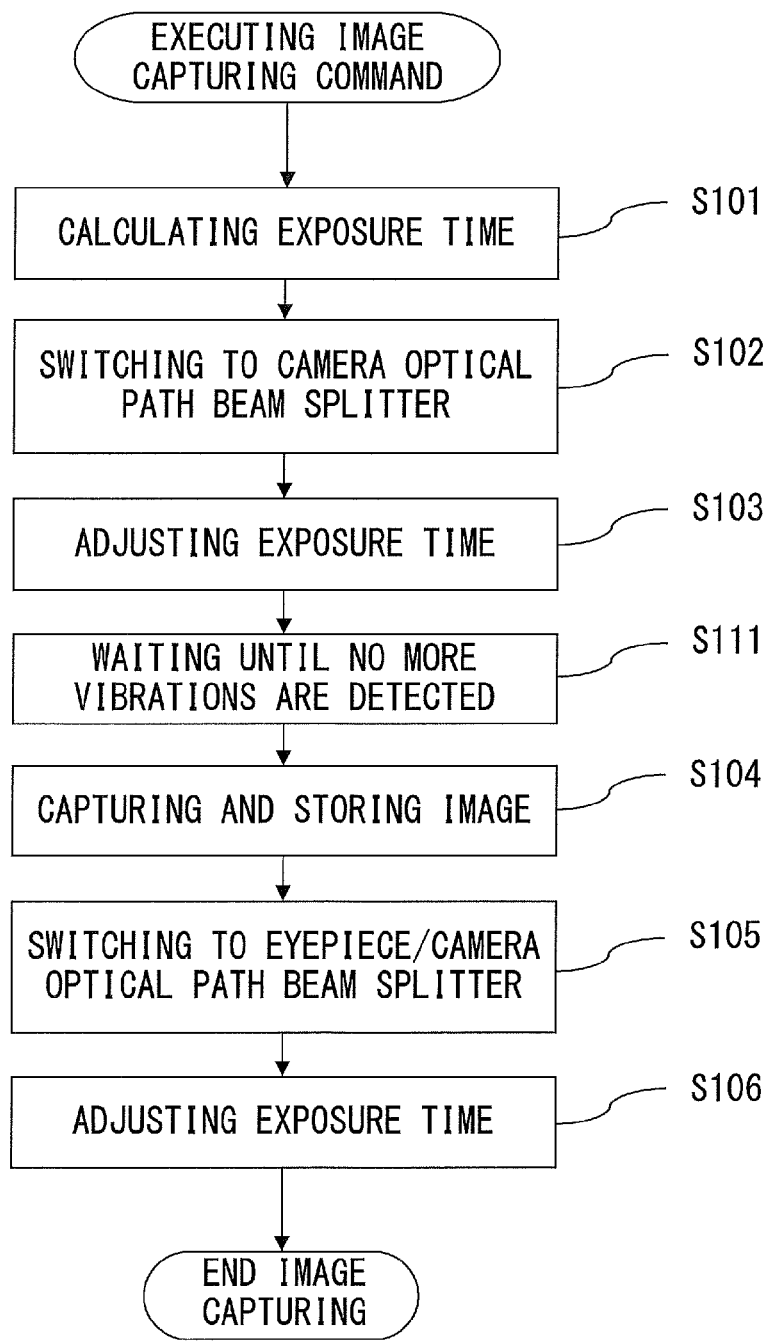
FIG. 4 illustrates a flow executed at the time of shooting of the microscope system in the modification example 1 of the first embodiment.

FIG. 4 illustrates a flow executed at the time of shooting of the microscope system in the modification example 1 of the first embodiment. The flow illustrated in FIG. 4 is implemented by adding a process of S111 to the flow of FIG. 2.

The vibration sensor 20 provided in the beam splitter unit 9 transmits an output of the sensor itself to the vibration sensor controlling unit 21. The vibration sensor controlling unit 21 monitors vibrations of the beam splitter 9 in accordance with the output of the vibration sensor 20. In this way, the vibration sensor controlling unit 21 detects the vibrations of the beam splitter unit 9 after optical path switching. Upon detection of the vibrations of the beam splitter unit 9, the vibration sensor controlling unit 21 transmits a signal indicating that the vibrations have been detected to the CPU 15. The CPU 15 does not execute an image capturing process while the vibration sensor 20 is detecting the vibrations of the beam splitter unit 9 after an optical path switching instruction is issued (S111).

Thereafter, the CPU 15 shoots and stores an image if it determines that the vibrations have not been detected for a predetermined duration. In this way, it becomes possible to shoot an image after beam splitter switching is securely performed.

MODIFICATION EXAMPLE 2

Additionally, the microscope system 1 may include a unit capable of changing the ratio of the amount of light split between the optical paths in accordance with a state of a shooting unit as a modification example 2 of the first embodiment. For example, beam splitter switching may be performed in accordance with a live image display ON or OFF instruction or with a shooting instruction which is issued by an observer.

Specifically, the observer can observe a sample by operating the microscope system as follows. The observer operates the digital camera 3 via the input device 18 and the CPU 15. If the live image display ON or OFF instruction or the shooting instruction is issued with a camera operation performed with the input device 18, the CPU 15 and the beam splitter controlling unit 12 communicate with each other. As a result, the beam splitter controlling unit 12 controls the beam splitter unit 9 to switch a beam splitter. Consequently, if the live image display is ON, switching to the eyepiece/camera optical path beam splitter 9c is performed. Alternatively, if the live image display is OFF, switching to the eyepiece optical path beam splitter 9a is performed. Further alternatively, if the shooting instruction is issued, switching to the camera optical path beam splitter 9b is performed. Here, an observer may arbitrarily set a beam splitter in association with a camera operation. Accordingly, for example, switching to the camera optical path beam splitter 9b may be performed if the live image display is ON.

In this embodiment, switching to the camera optical path beam splitter 9b is performed after the exposure time set when switching to the camera optical path beam splitter 9b is performed is calculated on the basis of the exposure time set when the eyepiece/camera optical path beam splitter 9c is selected, and the calculated exposure time is set in the digital camera 3. However, the implementation of this embodiment is not limited to this. Namely, any beam splitter may be used as long as switching to the second beam splitter is performed after the exposure time set when switching to the second beam splitter is performed is calculated on the basis of the exposure time set when the first beam splitter is selected and the calculated exposure time is set in the digital camera.

Assume that the first beam splitter splits the optical path at a ratio of the amount of light of $A_1:B_1$ (the eyepiece optical path:the camera optical path), and the second beam splitter splits the optical path at a ratio of the amount of light of $A_2:B_2$ (the eyepiece optical path:the camera optical path). In this case, the amount of light made incident to the digital camera when switching to the second beam splitter is performed results in a multiple of $\{B_2/(A_2+B_2)\}/\{B_1/(A_1+B_1)\}$ in comparison with the amount of light split when the first beam splitter is selected. Accordingly, the exposure time set when the second beam splitter 9b is selected results in a multiple of $\{B_1/(A_1+B_1)\}/\{B_2/(A_2+B_2)\}$ in comparison with the amount of light split when the first beam splitter 9c is selected.

According to this embodiment, the exposure time of the digital camera before the ratio of the amount of light split between the optical paths is changed (before beam splitter switching) is obtained, and an exposure time set after optical path switching is calculated in advance on the basis of the obtained exposure time. Then, the calculated exposure time is set in the digital camera at the same time that the ratio of the amount of light split between the optical paths is changed (after beam splitter switching). Accordingly, switching to an optimum optical path can be automatically performed in accordance with an operation of the digital camera. As a result, inconvenience or a loss in the length of time needed for optical path switching at the time of a microscope observation can be reduced. Moreover, a shooting mistake caused by an observer forgetting to change the ratio of the amount of light split between the optical paths can be prevented.

<Second Embodiment>

This embodiment refers to a microscope system that monitors a movement of the stage 6 of the microscope, that is capable of changing the ratio of the amount of light split between the optical paths in accordance with the movement of the stage 6, and that is capable of adjusting an exposure time to an optimum exposure time immediately after optical path switching by calculating, in advance, an exposure time set after optical path switching.

Figure 5:
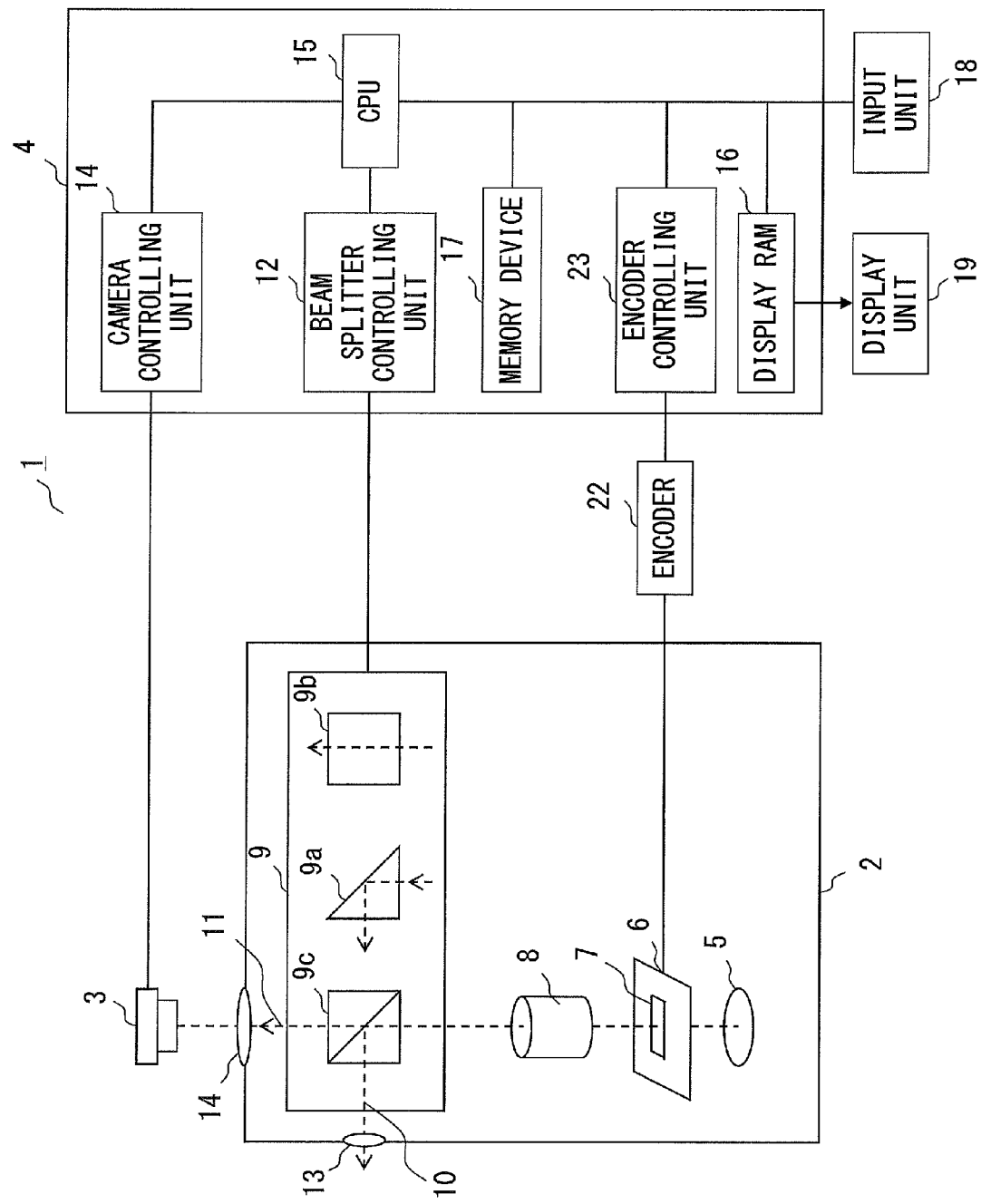
FIG. 5 illustrates an outline of a configuration of a microscope system according to the second embodiment.

FIG. 5 illustrates an outline of a configuration of the microscope system according to this embodiment. The microscope system illustrated in FIG. 5 is implemented by adding an encoder 22 and an encoder controlling unit 23 to the microscope system illustrated in FIG. 1.

In FIG. 5, the encoder 22 is connected to the stage 6, and is capable of detecting a movement of the stage 6 in the X, Y and Z directions. The encoder 22 is connected to the encoder controlling unit 23.

The encoder controlling unit 23 monitors an operational state of the stage 6 on the basis of a detection signal output from the encoder 22. The encoder controlling unit 23 is connected to the CPU 15, and is capable of transmitting an operation of the stage 6 to the CPU 15.

Figure 6B:
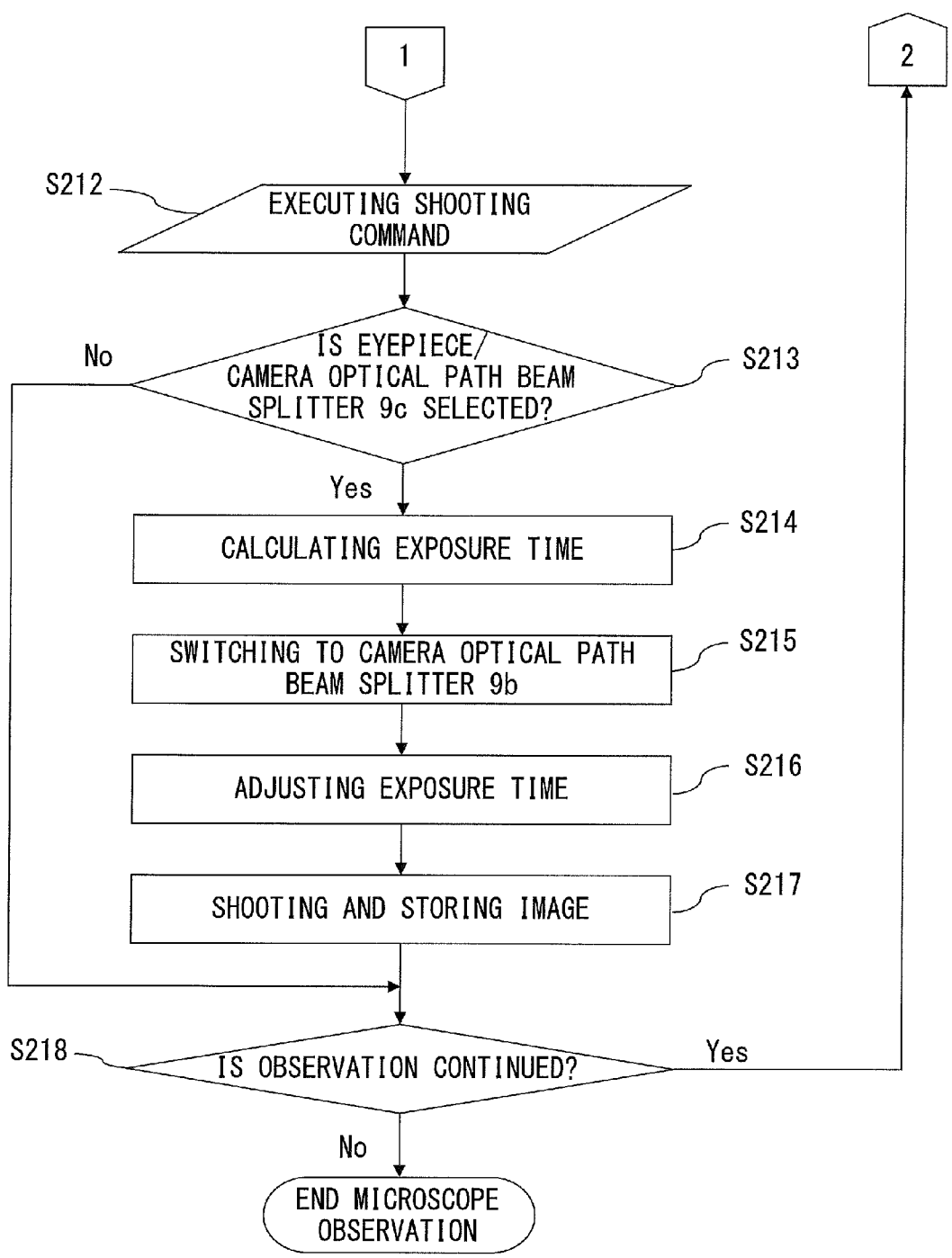
FIG. 6B illustrates a flow (No. 2) of the optical path switching which occurs with the operation of the stage in the second embodiment.

FIGS. 6A and 6B illustrate a flow of optical path switching that occurs with an operation of the stage 6 in this embodiment. The encoder 22 and the encoder controlling unit 23 monitor the operation of the stage 6 in the X, the Y, and the Z directions. Assume that an arbitrary beam splitter is selected in the beam splitter unit 9 at this time.

An observer moves the stage 6 in an X-Y direction by using the input device 18 for framing. Then, the encoder controlling unit 23 detects that the stage 6 is moving in the X-Y direction, and transmits a detection signal to the CPU 15 ("YES" in S202).

If it is reported by the encoder controlling unit 23 that the operation of the stage 6 has been detected, the CPU 15 communicates with the beam splitter controlling unit 12, and determines whether or not the camera optical path beam splitter 9b is selected in the optical path (S203). If the eyepiece optical path beam splitter 9a or the eyepiece/camera optical path beam splitter 9c is selected in the optical path ("NO" in S203), the flow goes to S207.

If the camera optical path beam splitter 9b is selected in the optical path ("YES" in S203), the CPU 15 communicates with the camera controlling unit 14 and obtains the exposure time of the digital camera 3 from the camera controlling unit 14. The CPU 15 calculates an exposure time set when switching to the eyepiece/camera optical path beam splitter 9c is performed on the basis of the obtained exposure time (S204). A calculation method is similar to that adopted in the first embodiment.

Next, switching to the eyepiece/camera optical path beam splitter 9c (S205) is performed. Namely, the CPU 15 communicates with the beam splitter controlling unit 12, and causes the beam splitter controlling unit 12 to transmit an optical path switching instruction to the beam splitter unit 9. Next, the beam splitter unit 9 switches from the eyepiece/camera optical path beam splitter 9c to the camera optical path beam splitter 9b.

Then, the CPU 15 adjusts the exposure time of the digital camera 3 to the exposure time calculated in advance in S204 via the camera controlling unit 14 (S206).

Additionally, if the observer makes a focus adjustment, the encoder controlling unit 23 detects that the stage 6 is moving in the Z direction and notifies the CPU 15 that the stage 6 is moving ("YES" in S207).

If it is reported by the encoder controlling unit 23 that the operation of the stage 6 has been detected, the CPU 15 communicates with the beam splitter controlling unit 12 and determines whether or not the eyepiece/camera optical path beam splitter 9c is selected in the optical path (S208). If the eyepiece optical path beam splitter 9a or the camera optical path beam splitter 9b is selected in the optical path ("NO" in S208), the flow goes to S212.

If the eyepiece/camera optical path beam splitter 9c is selected in the optical path ("YES" in S208), the CPU 15 communicates with the camera controlling unit 14 and obtains the exposure time of the digital camera 3 from the camera controlling unit 14. The CPU 15 calculates an exposure time set when switching to the camera optical path beam splitter 9b is performed on the basis of the obtained exposure time (S209). A calculation method is similar to that adopted in the first embodiment.

Next, switching to the camera optical path beam splitter 9b (S210) is performed. Namely, the CPU 15 communicates with the beam splitter controlling unit 12, and causes the beam splitter controlling unit 23 to transmit an optical path switching instruction to the beam splitter unit 9. Then, the beam splitter unit 9 switches to the camera optical path beam splitter 9b.

Thereafter, the CPU 15 adjusts the exposure time of the digital camera 3 to the exposure time calculated in advance in S209 via the camera controlling unit 14 (S211).

Additionally, if the observer executes the shooting command by using the input device 18 (S212), the CPU 15 communicates with the beam splitter controlling unit 12, and determines whether or not the eyepiece/camera optical path beam splitter 9c is selected in the optical path (S213). If the eyepiece optical path beam splitter 9a or the camera optical path beam splitter 9b is selected in the optical path ("NO" in S213), the flow goes to S218.

If the eyepiece/camera optical path beam splitter 9c is selected in the optical path ("YES" in S213), the CPU 15 communicates with the camera controlling unit 14 and obtains the exposure time of the digital camera 3. Then, the CPU 15 calculates an exposure time set when switching to the camera optical path beam splitter 9b is performed on the basis of the obtained exposure time (S214). A calculation method is similar to that adopted in the first embodiment.

Next, switching to the camera optical path beam splitter 9b (S215) is performed. Namely, the CPU 15 communicates with the beam splitter controlling unit 12 and causes the beam splitter controlling unit 12 to transmit an optical path switching instruction to the beam splitter unit 9. Then, the beam splitter unit 9 switches to the camera optical path beam splitter 9b.

Thereafter, the CPU 15 adjusts the exposure time of the digital camera 3 to the exposure time calculated in advance in S214 via the camera controlling unit 14 (S216). Then, the CPU 15 transmits a shooting instruction to the digital camera 3 via the camera controlling unit 14. As a result, the digital camera 3 shoots an image. Here, the image may be shot as a still image or a moving image. Digital image data of the microscope image obtained by the digital camera 3 is transmitted to the memory device 17 via the camera controlling unit 14 and the CPU 15, and is stored in the memory device 17 (S217). If the observation is continued, the processes in S201 to S217 are repeated (S218).

According to this embodiment, it is possible to automatically change the ratio of the amount of light split between the optical paths in accordance with an operation performed at the time of a microscope observation. As a result, an observer can observe a sample by using the eyepiece/camera optical path beam splitter at the time of framing without being aware of an optical path, and can observe a sample by using the camera optical path beam splitter at the time of a focus adjustment and shooting. Moreover, if optical path switching is performed, the amount of light made incident to the digital camera changes. However, an exposure time calculated in advance is set simultaneously with optical path switching. Accordingly, an observation can be continued without waiting for the completion of adjusting an exposure time. Therefore, a microscope observation can be continued without causing inconvenience or a shooting mistake, which often occurs with optical path switching.

According to the present invention, an exposure time set after the ratio of the amount of light split between the optical paths is changed (after beam splitter switching) is calculated in advance before the ratio of the amount of light split between the optical paths is changed (before beam splitter switching). As a result, a time loss caused by beam splitter switching can be eliminated. Moreover, the ratio of the amount of light split between the optical paths is changed on the basis of beam splitter switching, and at the same time, an exposure time is adjusted in accordance with a change in the amount of light made incident to the digital camera. As a result, an observation and shooting using an optimum observation optical path are enabled without making an observer aware of an optical path of the microscope. Accordingly, an observation more comfortable for an observer can be provided without causing a time loss, inconvenience, and a shooting mistake, all of which occur with beam splitter switching. Namely, by using a microscope system that is capable of changing the ratio of the amount of light split between the optical paths in accordance with a shooting condition or a microscope operation according to the present invention, a sharp microscope image can be shot quickly and easily.

The present invention is not limited to the above described embodiments, and can take a variety of configurations or embodiments within a scope that does not depart from the gist of the present invention.

What is claimed is:

1. A microscope system for observing a sample, comprising:
    a stage on which the sample is placed;
    an eyepiece lens for observing the sample with a naked eye;
    an image capturing unit for capturing an image of the sample;
    a light amount ratio changing unit for changing a ratio of an amount of light directed to a first optical path for directing an optical image of the sample to the eyepiece lens and a second optical path for directing the optical image of the sample to the image capturing unit;
    an image capturing controlling unit for controlling an exposure time of the image capturing unit; and
    a controlling unit for obtaining a first exposure time from the image capturing controlling unit if the light amount ratio changing unit sets the ratio of the amount of light to a first ratio of the amount of light, for calculating a second exposure time on the basis of the first exposure time and a second ratio of the amount of light changed by the light amount ratio changing unit, and for controlling the image capturing controlling unit to set the second exposure time as the exposure time of the image capturing unit if the light amount ratio changing unit changes to the second ratio of the amount of light;
    wherein the light amount ratio changing unit is a beam splitter unit for switching between a first beam splitter for making an observation light incident to the first optical path and the second optical path at a ratio of $A_1$ to $B_1$ and a second beam splitter for making the observation light incident to the first optical path and the second optical path at a ratio of $A_2$ to $B_2$, and
    if the light amount ratio changing unit selects the first beam splitter, the controlling unit obtains the first exposure time from the image capturing controlling unit, calculates the second exposure time by multiplying the first exposure time by $[B_1/(A_1+B_1)]/[B_2/(A_2+B_2)]$, and controls the image capturing controlling unit to set the second exposure time as the exposure time of the image capturing unit if the light amount ratio changing unit switches from the first beam splitter to the second beam splitter.

2. The microscope system according to claim 1, further comprising a vibration detecting unit for detecting vibrations that occur with a beam splitter change performed by the light amount ratio changing unit, wherein the controlling unit controls the image capturing controlling unit to drive the image capturing unit so as to capture an image by using the set second exposure time after the vibration detecting unit detects no more vibrations.

3. The microscope system according to claim 1, wherein
    the stage is an electrically operated stage that is movable in three spatial dimensions,
    a stage movement detecting unit for detecting a movement of the stage is further included, and
    the controlling unit causes the image capturing controlling unit to set the exposure time of the image capturing unit to the second exposure time by performing the control on the basis of a result of detection performed by the stage movement detecting unit.

4. A method for controlling a microscope system, comprising:
    obtaining a first exposure time set in an image capturing device if a first beam splitter which is set to a first ratio of an amount of light is selected by a beam splitter unit for switching from among a plurality of beam splitters each having a different ratio of the amount of light directed to a first optical path for directing an optical image of a sample to an eyepiece lens and a second optical path for directing the optical image of the sample to the image capturing device;
    calculating a second exposure time on the basis of the first exposure time and a second ratio of the amount of light corresponding to a second beam splitter that can be switched by the beam splitter unit;
    switching to the second beam splitter by the beam splitter unit; and
    capturing a microscope image by setting the calculated second exposure time in the image capturing device; wherein:
    the beam splitter unit switching between the first beam splitter for making an observation light incident to the first optical path and the second optical path at a ratio of $A_1$ to $B_1$ and the second beam splitter for making the observation light incident to the first optical path and the second optical path at a ratio of $A_2$ to $B_2$, and
    if the first beam splitter is selected, obtaining the first exposure time by multiplying the first exposure time by $[B_1/(A_1+B_1)]/[B_2/(A_2+B_2)]$, and controlling the image capturing to set the second exposure time as the exposure time if the first beam splitter is switched to the second beam splitter.

* * * * *